United States Patent Office — 3,595,906, Patented July 27, 1971

3,595,906
METHOD FOR PREPARING LIGHT-COLORED OLEFIN SULFONATES
Masuzo Nagayama and Hiroshi Okada, Tokyo, Japan, assignors to Lion Fat & Oil Co., Ltd., Tokyo, Japan
No Drawing. Filed May 2, 1969, Ser. No. 821,478
Claims priority, application Japan, May 16, 1968, 43/33,006
Int. Cl. C07c 143/16
U.S. Cl. 260—513      4 Claims

ABSTRACT OF THE DISCLOSURE

A method for preparing α-olefin sulfonates comprising mixing α-olefin feed with a certain type of Friedel-Crafts catalyst to react α-olefin component or impurities in the feed therewith, separating said component from the impurities, sulfonating the purified α-olefin component as a thin film, neutralizing the sulfonated α-olefin, and hydrolysing the neutralized products.

BACKGROUND OF THE INVENTION (1) Field of the invention

The present invention relates to a method for manufacturing olefin sulfonates of high purity, which method comprises sulfonating a mixture substantially consisting of straight chained α-olefin obtained by thermal or catalytic cracking of petroleum waxes as a thin film with sulfur trioxide gas, wherein, there is used as said olefin, one freed from the impurities, which are normally contained in the olefin feed, by the use of a Friedel-Crafts catalyst.

(2) Description of the prior art

Sulfonation of olefin by the use of sulfur trioxide gas is generally conducted by continuously contacting olefin in the form of a thin film with sulfur trioxide gas to effect reaction with each other and then olefin sulfonates are obtained by neutralizing and hydrolysing the resultant reaction products. Since sulfonates thus obtained show many excellent activities as surfactants and especially as detergents, they have a wide range of application and have recently been used as a base for household detergents.

As for the olefin to be used for preparing olefin sulfonates as mentioned in the foregoing, olefins having a relatively high content of α-olefin, such as those obtained from petroleum waxes by thermal cracking or from ethylene by polymerization under the presence of alkyl aluminum catalyst, are desirable. The latter α-olefin obtained by the polymerization of ethylene contains few impurities which cause coloring and problems as to the color of olefin sulfonates are hardly ever encountered therewith. However, the former α-olefin obtained by wax-cracking contains impurities in such amounts that the product obtained by sulfonation with sulfur trioxide gas becomes intensively colored and looks dark unless the coloring substances are removed.

It has hitherto been a customary practice to remove such color by the use of a bleaching agent or an adsorbent, and bleaching agents such as sodium hypochlorite are widely used. However, since sulfur trioxide which is used in the sulfonation reaction is itself a strongly reactive reagent, the sulfonation product thus prepared is colored so remarkably that the color can not be removed satisfactorily by the use of an adsorbent or a bleaching agent. Furthermore, the use of too much bleaching agent or adsorbent produces by-reactions such as decomposition and rancidity of alkenesulfonates contained in olefin sulfonates, so that it is not advisable to try to solve the color problems by the use of an adsorbent or a bleaching agent.

Several proposals have hitherto been made, of metthods for obtaining colorless olefin sulfonates. For instance, the Dutch patent application No. 6705918 proposes a method whereby the olefin feed is treated beforehand with sulfuric acid or adsorptive clay. This method, however, induces a side reaction in which α-olefin, which is contained in the olefin feed and which is the most desirable ingredient in the preparation of olefin sulfonates, is isomerized into internal olefin, and furthermore does not result in satisfactory anti-coloring effect, so that olefin sulfonates having an excellent color level can not be prepared by said method.

The Japanese Patent Publication No. 42–26602 discloses a method of another type in which a molecular sieve is used to treat the olefin feed. However, this method causes also unfavorable side reactions such as isomerization and polymerization of olefin and its anti-coloring effect is not very satisfactory. Another method of treating olefin with aluminum oxide has also been proposed. However, none of these methods has proved satisfactory enough to achieve the desired purposes.

SUMMARY OF THE INVENTION

The present invention provides a new method of preparing olefin sulfonates, which methol solves all the problems mentioned in the foregoing, whereby the utilities of olefin sulfonates thus obtained are enhanced and their qualities are improved.

As for the olefin which can be used as a feed material according to the present invention, products obtained by cracking petroleum waxes (including either thermal or catalytic cracking) are suitable. These petroleum waxes can be obtained by the process of dewaxing petroleum, and in this case it does not matter whether a sweating treatment or a de-oiling treatment by the use of a solvent is conducted. Various types of olefins obtained by reforming of petroleum can be used as a feed material in this invention, and the mixed higher aliphatic olefins obtained by polymerizing ethylene under the presence of an alkyl aluminum catalyst and then with the substitution reaction conducted by the use of the nickel catalyst can also be used in this invention. In addition to these olefins, the olefins obtained by dehydrogenation of paraffins or by the removal of hydrogen chloride from chlorinated paraffins can also be used as materials for this invention. Therefore the olefin feed to be used in this invention can be specified as an olefinic hydrocarbon whose carbon chain length ranges from approximately 5 to 30, preferably 10 to 25.

As a result of analysis of the impurities contained in these olefin feeds, we have found that the impurities are hydrocarbons as mentioned hereinafter. It is assumed that the impurities are neither sulfur-containing compounds, nitrogen-containing compounds, diolefins, branched olefins, nor vinylidene compounds, trisubstituted olefins (usually both of them are scarcely obtained by wax cracking or petroleum reforming), but they are a mixture of so-called cyclic olefins consisting of branched, straight-chain, highly unsaturated side-chain mono-or dicyclic or polycyclic compounds and compounds having several polar radicals, comprising usually 50–200 kinds of compounds, together with isomers. It is believed that they are principally the derivatives of benzenes, naphthalenes, diphenyls, diphenylethylenes, acenaphthenes, and acenaphthylenes. Therefore, if these cyclic hydrocarbons contained in the olefin feed are removed, light colored olefin sulfonates can be obtained. An economical and effective method of removing these cyclic hydrocarbons from the α-olefin feed are attained by polymerizing the impurities into a low-molecular polymer in the presence of a Friedel-Crafts catalyst, followed by rectification.

The Friedel-Crafts catalyst referred to above is anhydrous ferric chloride or boron trifluoride (including its complexes). The use of aluminum chloride is not desirable in this case, though it is generally used as a catalyst, since it acts so strongly as to induce isomerization or polymerization of the olefin itself. Such catalysts as $SbCl_3$, $TeCl_3$, $SnCl_4$, $TiCl_4$, $TeCl_4$, $BiCl_3$, $ZnCl_2$, etc. (antimony trichloride, tellurium trichloride, stannic chloride, titanium tetrachloride, tellurium tetrachloride, bismuth (III) chloride, zinc chloride, etc.) have slow reactivity and are costly, proving themselves not suitable to be used on an industrial and commercial scale. Besides these chlorides, acids such as hydrogen fluoride, sulfuric acid, phosphorous pentoxide, phosphoric acid and the like are also not suitable for practical use due to similar reasons.

The treatment of the impurities according to the present invention is conducted by adding anhydrous ferric chloride or boron tri-fluoride (or $BF_3$-etherate) to the olefin feed consisting essentially of olefin obtained by wax-cracking as described above.

The amount of such a catalyst used varies with the content of the impurities but it is usually within the range of 0.1 to 10 wt. percent based on the weight of the olefin feed, preferably 0.5 to 5 wt. percent.

Excessive addition of the catalyst, as for example more than 10 wt. percent, does not result in more effective purification but often unexpectedly results in inducing isomerization of the olefin itself.

The factors leading to isomerization of the olefin may be not only the nature or amount of the catalyst but also the reaction conditions, namely, the temperature and time for treatment. In order to achieve a good result in the purification of olefin without extreme isomerization thereof, the temperature should be within the range of 10 to 50° C., or more preferably 20 to 40° C., and the time of treatment, which varies with the temperature and the kind of the catalyst, should be within the range of 3 hours to 4 weeks. The treating time when anhydrous ferric chloride is used is longer than when a boron trifluoride type catalyst is used, since its catalytic activity is weaker than that of boron trifluoride or $BF_3$-etherate. The optimum conditions of the treating time and the temperature in using anhydrous ferric chloride are given below:

| Treating temperature: | Treating time |
|---|---|
| 20° C. | 48 hrs. to 4 weeks. |
| 30° C. | 24 to 48 hrs. |
| 40° C. | 24 hrs. |

A mechanical stimulus such as stirring and the like, of course, affects on the treating time. When boron fluoride or $BF_3$-etherate is used as a catalyst under the substantially same condition as stated above, the relationship of the temperature versus time is shown in the following table:

| Treating temperature: | Treating time |
|---|---|
| 20° C. | 24 hrs. to 1 week. |
| 30° C. | 3 to 24 hrs. |
| 40° C. | 3 to 6 hrs. |

If the purification of the olefin feed is conducted with the catalyst under the treating conditions above mentioned the isomerization of the olefin itself is scarcely encouraged and accordingly it is understood that there is no substantial problem from the viewpoint of practical use. After the polymerization reaction between the impurities has been completed, stirring is stopped and the liquor is allowed to stand for a time in order to precipitate a dark colored slurry consisting of the low molecular polymer of impurities and the catalyst. The upper layer is then separated from the precipitates, washed with an alkaline solution or water, dehydrated, and finally purified by distillation under a reduced pressure or atmosphere pressure. The lower layer consisting of the precipitates is used by recycling to the succeeding purification process.

The purified olefin thus obtained is sulfonated by contacting same continuously in the form of a thin film with a sulphur trioxide gas or more preferably with a sulfur trioxide gas diluted with an inert gas, and then neutralized with a suitable amount of alkali and finally hydrolysed, whereby olefin sulfonates of light color and an excellent surface activity are obtained.

When the Friedel-Crafts catalyst is used, the formed polymers of low molecular weight have a higher boiling point than that of the $\alpha$-olefin, so the polymers can be separated from the $\alpha$-olefin predominantly obtained by fractional distillation.

Therefore, scarcely any such impurities as cause coloring are contained in the olefin at the sulfonation step and accordingly highly pure and light colored olefin sulfonates are obtained.

It is indeed surprising that according to this invention substantially colorless olefin sulfonates can be prepared even when there is used a very reactive sulfonating agent such as sulfur trioxide and under relative severe reaction conditions (in case of the thin film contact reaction, the product will be exposed to a temperature as high as 50 to 100° C.).

In the foregoing, a detailed explanation has been made about the present invention, and when summed up, it may be said that according to the present invention mixed hydrocarbons with $C_5$ to $C_{30}$ which contain straight-chained olefins in relatively large quantities may be used as an olefin feed. Although no limit is specially set as to the process of sulfonation reaction, it is advisable to adopt the method wherein the olefin in the form of a thin film is made to contact with a sulfur trioxide gas to form alkene sulfonates and 1,3- or 1,4-sultones as much as possible. Some type of hydrolysis can be adopted for hydrolysing the sultones into water-soluble sulfonates.

The present invention will hereinafter be described in further detail in connection with the following examples; however, this invention is not intended to be limited by the details set forth in these examples.

DESCRIPTION OF THE PREFERRED EMBODIMENTS

Example 1

In a 1-liter capacity autoclave equipped with an effective stirrer was placed 500 g. of $\alpha$-olefin ($C_{11}$–$C_{14}$) obtained by cracking the waxes which had been obtained by dewaxing of the petroleum, to which was added 5 g. of gaseous boron trifluoride at 25° C., the contents being kept at the same temperature for 24 hours with agitation. The $\alpha$-olefin thus treated was washed with 100 g. of 10% aqueous solution of sodium bicarbonate, then washed again with water two times, and after having been dried, it was distilled at 10 mm. Hg and 70–120° C., and thus purified $\alpha$-olefin was obtained at a yield of 94%. The composition and properties of the crude $\alpha$-olefin used in this example and the purified $\alpha$-olefin are given in Table 1. Incidentally, the isomerization of the $\alpha$-olefin to an internal olefin of trans-form was not appreciable.

TABLE 1.—COMPOSITION AND PROPERTIES OF $\alpha$-OLEFINS ($C_{11}$–$C_{14}$)

| | $\alpha$-Olefins | |
|---|---|---|
| | Crude | Purified |
| Carbon number distribution (wt. percent): | | |
| $C_{10}$ or less | 5.0 | 4.0 |
| $C_{11}$ | 25.3 | 25.8 |
| $C_{12}$ | 23.0 | 23.4 |
| $C_{13}$ | 22.5 | 22.9 |
| $C_{14}$ | 22.4 | 22.8 |
| $C_{15}$ | 1.8 | 1.1 |
| Ingredients (wt. percent): | | |
| $\alpha$-Olefin | 87.3 | 90.3 |
| Paraffin | 2.0 | 1.6 |
| Internal-olefin | 0.4 | 0.7 |
| Diolefin | 6.8 | 5.7 |
| Branch-chained olefin and cyclic olefin | 3.6 | 1.7 |

The two olefins described in Table 1 were then sulfonated by the use of a sulfur trioxide gas diluted with an inert gas under just the same conditions in the falling film type continuous thin film sulfonator, neutralized with alkali and hydrolysed into sodium α-olefin sulfonates. Their properties are as shown in Table 2, from which it is clearly understood that the use of the purified olefin increases the yield and improves the color level and the products thus obtained can be used satisfactorily if bleached somewhat.

TABLE 2.—PROPERTIES OF SODIUM α-OLEFIN SULFONATES ($C_{11}$-$C_{14}$)

| | α-Olefins | |
|---|---|---|
| | Crude | Purified |
| Reaction conditions: | | |
| Molar ratio of $SO_3$/α-olefin | 1.20 | 1.20 |
| Reaction temperature (° C.) | 80 | 80 |
| Quantity of unreacted oils percent (to AOS [1]) | 6.0 | 4.0 |
| Color level of 2% aqueous solution of sodium α-olefin sulfonates (Klett value): | | |
| Unbleached | 850 | 300 |
| Bleached [2] | 135 | 35 |

[1] AOS is α-olefin sulfonate.
[2] 3% sodium hypochlorite was added to AOS.

Example 2

500 g. of α-olefin ($C_{15}$–$C_{18}$) obtained in the same method provided in Example 1 was placed in a 1-liter capacity glass flask fitted with an effective stirrer and heated up to 30° C. Then 10 g. of $BF_3$-etherate (containing 47% boron trifluoride) was added to the above α-olefin and was kept at 30° C. for three hours with agitation. After the mixture was stood still for 30 minutes, a slurry precipitate consisting of excessive boron trifluoride complexes and polymers of impurities was taken out of the lower layer and 100 g. of 10% aqueous solution of sodium carbonate was added to the content of the glass flask. After thorough agitation, the lower layer was removed and the α-olefin was washed with water two times, dehydrated and dried. The α-olefin thus treated was distilled at 1–2 mm. Hg and 95–130° C. and 465 g. of purified α-olefin was obtained. The composition and properties of the crude α-olefin and the purified α-olefin are given in Table 3. Only a little of the α-olefin was isomerized to internal-olefins.

TABLE 3.—COMPOSITION OF PROPERTIES OF α-OLEFINS ($C_{15}$–$C_{18}$)

| | α-Olefins | |
|---|---|---|
| | Crude | Refined |
| Carbon number distribution (wt. percent): | | |
| $C_{13}$ or less | 0.63 | 0 |
| $C_{14}$ | 1.68 | 1.04 |
| $C_{15}$ | 29.51 | 30.89 |
| $C_{16}$ | 27.87 | 31.77 |
| $C_{17}$ | 25.37 | 26.92 |
| $C_{18}$ | 14.06 | 8.94 |
| $C_{19}$ | 0.88 | 0.44 |
| Ingredients (wt. percent): | | |
| α-olefin | 87.51 | 90.15 |
| Paraffin | 1.64 | 1.30 |
| Internal-olefin | 0.52 | 0.75 |
| Diolefin | 7.07 | 5.44 |
| Branch-chained olefin and cyclic olefin | 3.26 | 2.37 |

Sodium α-olefin sulfonates were prepared from these α-olefins according to the same method as provided in Example 1. Their properties are as shown in Table 4 and the yield and the color level of the product were greatly improved by means of the purification treatment.

TABLE 4.—PROPERTIES OF SODIUM α-OLEFIN SULFONATES ($C_{15}$-$C_{18}$)

| | α-Olefins | |
|---|---|---|
| | Crude | Purified |
| Reaction conditions: | | |
| Molar ratio of $SO_3$/α-olefin | 1.20 | 1.20 |
| Reaction temperature (° C.) | 80 | 80 |
| Quantity of unreacted oils percent (to AOS) | 5.0 | 3.5 |
| Color level of 5% aqueous solution of sodium α-olefin sulfonates (Klett value): | | |
| Unbleached | 830 | 290 |
| Bleached No. 1 [1] | 170 | 60 |
| Bleached No. 2 [2] | 120 | 30 |

[1] 1% sodium hypochlorite was added to AOS.
[2] 3% sodium hypochlorite was added to AOS.

Example 3

In a 3000-liter capacity stainless tank equipped with an effective stirrer, was placed 1000 kg. of crude α-olefin ($C_{15}$-$C_{20}$) prepared in the same way acording to Example 1 and kept at 30° C., 50 kg. of anhydrous ferric chloride powder was added. After the mixture was kept at 30° C. for 48 hours with agitation, 100 kg. of 3 N HCl was added to complete the reaction, and the agitation was further continued for 10 minutes. The product was allowed to stan duntil it separated into two layers and then the lower layer was removed. 100 kg. of 10% aqueous solution of sodium bicarbonate was added to the upper layer, agitated, and neutralized. The formed lower layer was taken out. The product was washed with 500 kg. of water two times, dehydrated and dried. The α-olefin thus obtained was distilled at 20 mm. Hg and 140–210° C. to be refined. The yield of the purified α-olefin was 93%. Table 5 shows the composition and properties of the crude α-olefin and the purified α-olefin.

TABLE 5.—COMPOSITION AND PROPERTIES OF α-OLEFINS ($C_{15}$-$C_{20}$)

| | α-Olefins | |
|---|---|---|
| | Crude | Purified |
| Carbon number distribution (wt. percent): | | |
| $C_{13}$ or less | 0.6 | 0 |
| $C_{14}$ | 2.5 | 1.8 |
| $C_{15}$ | 16.3 | 16.9 |
| $C_{16}$ | 20.6 | 21.4 |
| $C_{17}$ | 14.2 | 14.7 |
| $C_{18}$ | 18.4 | 19.1 |
| $C_{19}$ | 15.4 | 15.9 |
| $C_{20}$ | 12.1 | 10.2 |
| Ingredients (wt. percent): | | |
| α-Olefin | 81.7 | 86.7 |
| Paraffin | 3.1 | 3.2 |
| Internal-olefin | 0.7 | 0.9 |
| Diolefin | 7.3 | 4.3 |
| Branch-chained olefin and cyclic olefin | 7.9 | 4.9 |

Sodium α-olefin sulfonates were prepared by sulfonating the two olefins mentioned in Table 5 under the same reaction conditions as described in Example 1 by the use of the continuous thin film sulfonator. Their properties are shown in Table 6 and it is obvious that the yield of sodium α-olefin sulfonates has been increased by the treatment according to the present invention and their color level also greatly improved.

TABLE 6.—PROPERTIES OF SODIUM α-OLEFIN SULFONATES ($C_{15}$-$C_{20}$)

| | α-Olefins | |
|---|---|---|
| | Crude | Refined |
| Quantity of unreacted oils percent (to AOS) | 8.0 | 5.5 |
| Color of 5% aqueous solution of sodium α-olefin sulfonates (Klett value) | 1,000 | 400 |
| Color level of 5% aqueous solution after bleaching with sodium hypochlorite (Klett value) [1] | 250 | 50 |

[1] 3% sodium hypochlorite was added to AOS.

What we claim is:

1. In a process for preparing α-olefin sulfonate containing from 5 to 30 carbon atoms from a material obtained by the thermal or catalytic cracking of petroleum waxes and containing a major amount of α-olefin and a minor amount of a mixture of cyclic olefins, in which α-olefin-containing material in the form of a thin film is contacted with sulfur trioxide gas in a sulfonation zone, neutralized with alkali and then hydrolyzed in order to form α-olefin sulfonate, the improvement for reducing the coloring substances in the α-olefin sulfonate product which comprises contacting said material with a Friedel-Crafts catalyst selected from the group consisting of ferric chloride, boron trifluoride and boron trifluoride-etherate at a temperature in the range of 10 to 50° C., separating low molecular weight polymer substances derived from said cyclic olefins from the remainder of said material and then subjecting the remainder of said material to sulfonation.

2. A method according to claim 1 wherein said temperature is within the range of 20 to 40° C.

3. A method according to claim 1 wherein catalyst is used in an amount of from 0.1 to 10 wt. percent, based on the weight of said material.

4. A method according to claim 3 wherein said catalyst is used in an amount of from 0.5 to 5 wt. percent, based on the weight of said material.

References Cited

UNITED STATES PATENTS 3,481,849   12/1969   Beermann et al. ------ 260—513

DANIEL D. HORWITZ, Primary Examiner

U.S. Cl. X.R.

260—677A